United States Patent [19]

Daughtry et al.

[11] Patent Number: 4,559,716
[45] Date of Patent: Dec. 24, 1985

[54] METHOD AND APPARATUS FOR DETERMINING THE DISTANCE AND ANGULAR ORIENTATION BETWEEN TWO STRUCTURALLY UNCONNECTED MEMBERS

[75] Inventors: Arthur C. Daughtry; William M. McDonald, both of Houston, Tex.

[73] Assignee: Exxon Production Research Co., Houston, Tex.

[21] Appl. No.: 621,979

[22] Filed: Jun. 18, 1984

[51] Int. Cl.$^4$ .......................... G01B 5/00; G01B 5/14
[52] U.S. Cl. ...................................... 33/529; 33/534; 33/180 R
[58] Field of Search ............... 33/1 H, 174 R, 174 G, 33/174 K, 174 N, 180 R, 529, 534

[56] References Cited

U.S. PATENT DOCUMENTS

| | | | |
|---|---|---|---|
| 2,431,101 | 11/1947 | Woods | 33/174 N |
| 3,667,128 | 6/1972 | Morgan | 33/174 N |
| 3,854,211 | 12/1974 | Oliver et al. | 33/1 H |
| 4,120,095 | 10/1978 | Lebourg | 33/174 N |
| 4,472,883 | 9/1984 | Ortega | 33/1 H |

Primary Examiner—Richard R. Stearns
Attorney, Agent, or Firm—Keith A. Bell

[57] ABSTRACT

A method and apparatus for determining the distance and angular orientation between two structurally unconnected members, such as two sections of a subsea pipeline, is disclosed. The apparatus of the invention comprises generally two guide posts fixedly disposed, respectively, in known spaced relationship to the two structurally unconnected members and a remotely operable template. The remotely operable template comprises generally a variable length frame member; two guide members movably secured, respectively, to the outer ends of the variable length frame member and adapted to mate, respectively, with the guide posts; positioning means associated with each guide member and its respective guide post for properly positioning each guide member on its guide post; and means for measuring the distance between the outer ends of the variable length frame member and the angular orientation of each guide member after the guide members and the guide posts have been properly mated. The method of the invention comprises generally the steps of fixedly disposing two guide posts in known spaced relationships, respectively, to the two structurally unconnected members; measuring the distance and angular orientation between the guide posts with a remotely operable template; and computing the distance and angular orientation between the two structurally unconnected members from such measurement.

17 Claims, 6 Drawing Figures

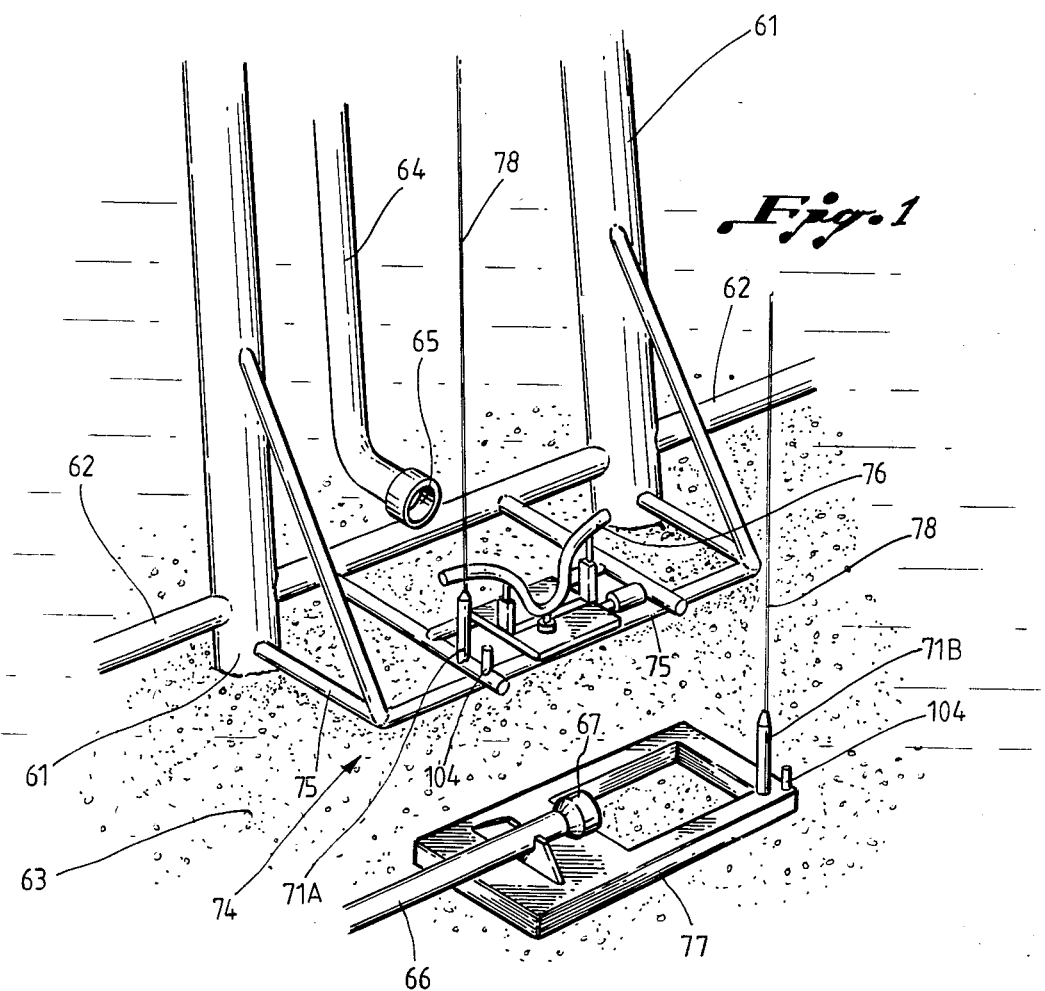
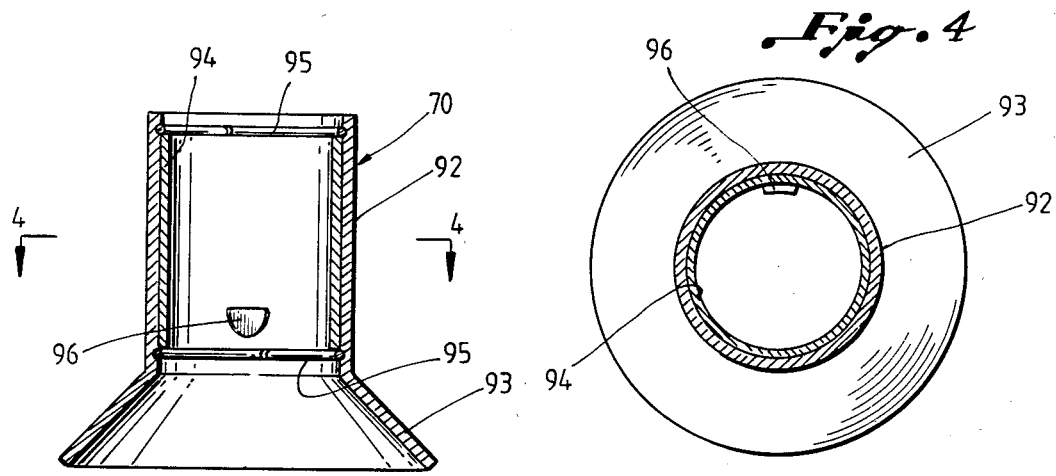

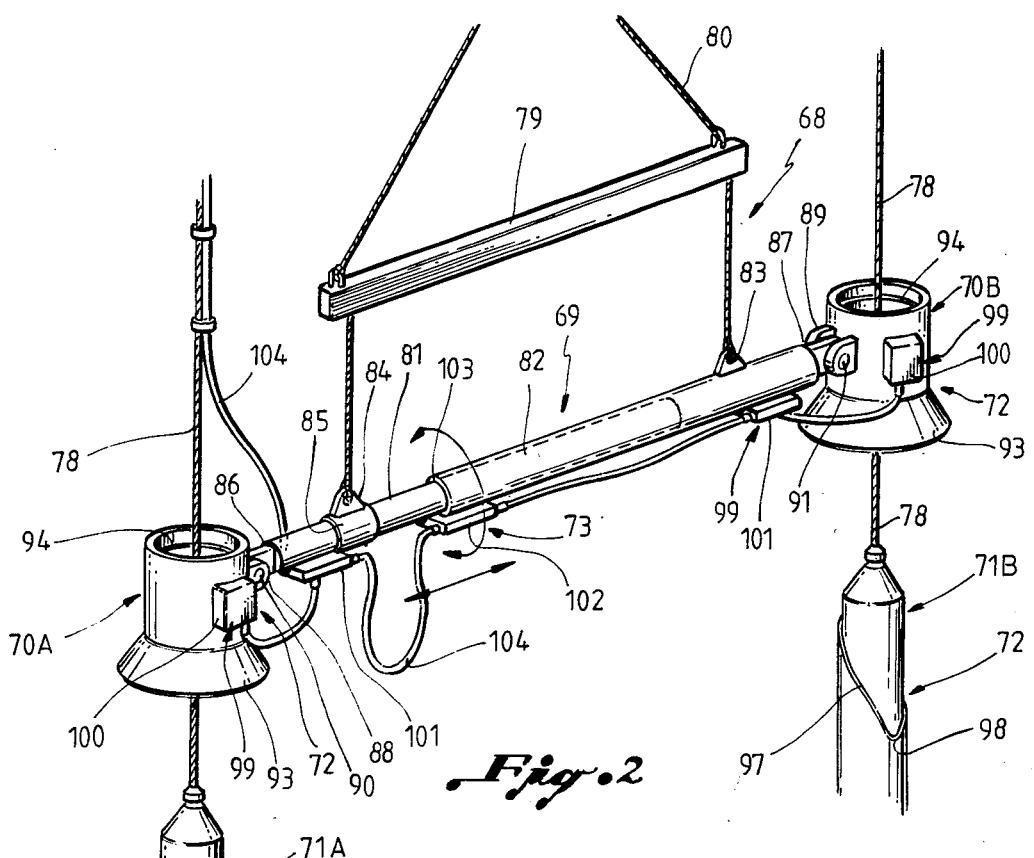

METHOD AND APPARATUS FOR DETERMINING THE DISTANCE AND ANGULAR ORIENTATION BETWEEN TWO STRUCTURALLY UNCONNECTED MEMBERS

FIELD OF THE INVENTION

This invention relates to a method and apparatus for remotely determining the distance and angular orientation between two structurally unconnected members, such as two unconnected sections of a subsea pipeline.

BACKGROUND OF THE INVENTION

Offshore hydrocarbon producing operations typically require the installation of subsea pipelines to transport the produced hydrocarbons from one location to another. In many situations, installation of a subsea pipeline requires that the ends of two unconnected sections of pipeline disposed adjacent the ocean floor must be connected by a specially fabricated spool piece which can only be fabricated by knowing the exact distance and angular orientation between the ends of the unconnected sections. Typically, these distance and angular orientation measurements are obtained by utilizing the services of a diver, or a manned submarine or diving bell.

Water depths of interest to the offshore petroleum industry have now increased to the point where use of a diver or a manned submarine or diving bell is either prohibitively expensive or impractical. Further, in deep waters the hazards associated with manned subsea operations may be excessive. Accordingly, the need exists for a remotely operable method and apparatus for determining the distance and angular orientation between two structurally unconnected members disposed adjacent the ocean floor, which do not require manned subsea operations and which are efficient and economical to use. The present invention satisfies this need.

SUMMARY OF THE INVENTION

The present invention provides a remotely operable method and apparatus for determining the distance and angular orientation between two structurally unconnected members, such as two unconnected sections of a subsea pipeline. In general, the apparatus of the invention consists of a remotely operable template and two guide posts, each of the guide posts being fixedly disposed in a known spaced relationship with, and adjacent to, one of the structurally unconnected members. The remotely operable template includes a variable length frame member having two ends; two guide members movably secured, respectively, to the two ends of the variable length frame member, each of the guide members adapted to mate, respectively, with one of the guide posts; positioning means associated with each of the guide members and its corresponding guide post for positioning the guide member with respect to the guide post; and means for measuring the distance between the two ends of the variable length frame member and the angular orientation of each of the two guide members with respect to the variable length frame member after each of the guide members has been properly mated with its respective guide post.

In the preferred embodiment of the invention, the variable length frame member comprises a first tubular member which is telescopically and rotatably received within a second tubular member. The two guide members are movably secured to the outer ends of the first and second tubular members by hinges. The positioning means generally comprises a rotatable sleeve associated with each guide member, a camming pin associated with each rotatable sleeve, and a camming surface having a lower stop position associated with each guide post. As each of the guide members is lowered into engagement with its respective guide post, the camming pins engage the camming surfaces thereby causing the rotatable sleeves to rotate until the camming pins reach the lower stop positions.

Typically, the means for measuring the distance between the two ends of the variable length frame member comprises a means for marking the first tubular member to indicate its position with respect to the second tubular member. The means for measuring the angular orientation of each of the two guide members with respect to the variable length frame member may include means for locking each guide member into a fixedly secured relationship with respect to the variable length frame member. Further, the apparatus of the present invention may include means for locking each of the rotatable sleeves within its respective guide member to prevent further movement therebetween.

Each of the ends of the unconnected sections of subsea pipeline has associated therewith a base structure. The guide posts are fixedly secured to the respective base structures in known spaced relationships to the ends of the unconnected sections. The angular orientation of the lower stop position of the camming surface with respect to the end of the corresponding unconnected section is also known. Typically, guidelines extending upwardly to the surface of the body of water are attached to the upper ends of the guide posts. These guidelines are threaded through the guide members to aid in proper positioning thereof. An acoustic transponder may also be mounted on each of the base structures near the guide posts. These acoustic transponders are used to obtain an approximation of the distance between the guide posts.

In practicing the method of the present invention, the remotely operable template is lowered from the surface of the body of water by a cable. The guidelines attached to the upper ends of the guide posts aid in guiding each of the guide members into proper engagement with its respective guide post. As the guide member engages its guide post, the camming pin contacts and follows along the camming surface of the guide post thereby causing the rotatable sleeve to rotate within the guide member. This rotation continues until the camming pin reaches the lower stop position of the camming surface. During positioning of the template, the first tubular member telescopes into or out of the second tubular member as required so that the distance between the guide members equals the distance between the guide posts. Additionally, rotation of the first tubular member within the second tubular member and movement of the hinges combine to compensate for any misalignment or elevational difference between the guide posts.

After the remotely operable template has been properly positioned, the variable length frame member is marked to record the position of the first tubular member with respect to the second tubular member and all other movable parts are locked in position. The template is then retrieved to the surface of the body of water where the distance and angular orientation between the guide posts may be measured and recorded. Once the distance and angular orientation between the guide posts have been determined, the distance and angular orientation between the ends of the unconnected sections of pipeline may be computed and the spool piece may be fabricated.

BRIEF DESCRIPTION OF THE DRAWINGS

The actual operation and advantages of the present invention will be better understood by referring to the following detailed description and the attached drawings; in which:

FIG. 1 is a partial perspective view illustrating a pipeline lying on the ocean floor adjacent an offshore platform riser, the distance and angular orientation between the pipeline and the riser being unknown;

FIG. 2 is a partial perspective view illustrating one embodiment of the remotely operable template of the present invention;

FIG. 3 is a cross-sectional view along the longitudinal axis of a guide member for use in connection with the present invention;

FIG. 4 is a cross-sectional view taken along line 4—4 of FIG. 3; and

FIGS. 5A and 5B are partial elevation views of a guide post for use in connection with the present invention, FIG. 5B illustrating the guide post which has been rotated 90° about its longitudinal axis from the position shown in FIG. 5A.

While the invention will be described in connection with the preferred embodiment, it will be understood that the invention is not limited to that embodiment. On the contrary, it is intended to cover all alternatives, modifications, and equivalents, which may be included within the spirit and scope of the invention, as defined by the appended claims.

DETAILED DESCRIPTION OF THE INVENTION

In FIG. 1, a typical application for the method and apparatus of the present invention is shown wherein a plurality of legs 61 of an offshore platform structure, including brace members 62, are disposed on the ocean floor 63. A conventional platform riser 64 is secured to the platform structure 61, 62 using known means (not shown) and its end 65 is disposed adjacent the ocean floor. A subsea pipeline 66 has been laid on ocean floor 63 and its end 67 is disposed in a spaced relationship from end 65 of platform riser 64, the exact distance and angular orientation between ends 65 and 67 being unknown. It is desired to determine the exact distance and angular orientation between ends 65 and 67 in order to fabricate a spool piece (not shown) to connect pipeline 66 and platform riser 64.

With reference now to FIGS. 1 and 2, the apparatus of the present invention for determining the distance and angular orientation between two structurally unconnected members, such as platform riser 64 and pipeline 66, will be described. The apparatus consists primarily of a remotely operable template 68 and two guide posts 71A, 71B which are fixedly disposed, respectively, in known spaced relationships to platform riser 64 and pipeline 66. Template 68 generally comprises a variable length frame member 69; two guide members 70A, 70B adapted to mate, respectively, with guide posts 71A, 71B; positioning means 72, associated with each of the guide members 70A, 70B and its corresponding guide post 71A, 71B; and a means 73 for measuring the distance between the two ends of the frame member 69 and the angular orientation of each of the two guide members 70A, 70B with respect to frame member 69.

As best illustrated in FIG. 1, a guide base structure, generally shown at 74, is associated with the end 65 of riser 64, and comprises a plurality of support members 75 fixedly secured to platform legs 61 and brace members 62, as by welding. At the point in time when guide base structure 74 is affixed to the offshore platform, normally prior to installation of the platform structure, the exact distance and angular orientation between guide post 71A and end 65 of the platform riser 64 is measured and recorded. Guide base structure 74 may also include additional support member 76 which provides support for the spool piece (not shown) which will ultimately be disposed between end 65 of platform riser 64 and end 67 of pipeline 66.

Pipeline 66 also has a guide base structure 77 associated with its end 67. Guide post 71B is fixedly secured to guide base structure 77 in a known spaced relationship with end 67 of pipeline 66. Guide base structure 77 is fixedly secured to pipeline 66 prior to installation of the last section of pipeline 66, and the exact distance and angular orientation between guide post 71B and the end 67 of pipeline 66 are measured and recorded.

Thus, the distance and angular orientation between each guide post 71A, 71B and the end of its respective structural member, riser 64 or pipeline 66, are known. However, the distance and angular orientation between end 65 of platform riser 64 and end 67 of pipeline 66 are unknown, and must be determined in order to fabricate the necessary connecting spool piece. The distance and angular orientation between end 65 and end 67 may be determined by measuring the distance and angular orientation between guide posts 71A, 71B with the present invention and combining such measurements with the known spaced relationships between each of the guide posts 71A, 71B and the end of its respective structural member.

Still with reference to FIGS. 1 and 2, it is seen that conventional guidelines 78, extend upwardly from guide posts 71A, 71B to the surface of the body of water. The template 68 is lowered downwardly toward the ocean floor 63 along guidelines 78. Preferably, template 68 is supported by a conventional spreader bar 79 and a lift cable 80, cable 80 being secured to the variable length frame member 69 as will hereinafter be described. Variable length frame member 69 preferably comprises a first tubular member 81 which is telescopically and rotatably received within a second tubular member 82. Accordingly, one section of lift cable 80 is secured to tubular member 82 as by an eyelet 83 which is fixedly secured to tubular member 82. The other section of lift cable 80 is movably secured to tubular member 81 as by an eyelet 84 and sleeve 85 which is in sliding engagement with tubular member 81. Sleeve 85 allows tubular member 81 to freely telescope into and out of tubular member 82 while still supporting variable length frame member 69.

With reference now to FIG. 2, it is seen that each guide member 70A, 70B, is movably secured to an end 86, 87 of variable length frame member 69. Preferably, guide members 70A, 70B are movably secured to frame member 69 as by hinges 88, 89, which allow guide members 70A, 70B to pivot about hinge pins 90, 91. Alternatively, guide members 70A, 70B could be movably secured to frame member 69 as by a ball joint coupling (not shown) whereby guide members 70A, 70B would be freely pivotable about the ball joint. Use of ball joints in place of hinges 88, 89 would eliminate the need for member 81 to be rotatably received in member 82 since the ball joints would provide the necessary rotation about the longitudinal axis of frame member 69. In this case, members 81 and 82 may have any suitable cross section which accommodates the necessary longitudinal telescoping movement.

With reference now to FIGS. 2–4, the construction of guide members 70A, 70B will be described in greater detail. Insofar as the construction of each guide member 70A, 70B is identical, common reference numerals will be used and the details of construction of only one guide member will be described. Guide member 70 generally comprises a tubular member 92 having a lower, outwardly flared section 93. As the guide members 70 are lowered into engagement with guide posts 71, as will be hereinafter described, outwardly flared section 93 of guide members 70 assist in initially aligning guide members 70 over the top of guide posts 71. Disposed within tubular member 92 of each guide member 70 is a rotatable sleeve 94 which is held in place within guide member 70 by any suitable means, such as split retainer rings 95. Rotatable sleeve 94 has a camming pin 96 disposed on its interior surface, the function of which will be hereinafter described in greater detail in connection with positioning means 72 associated with each of the guide members 70 and its corresponding guide post 71.

With reference now to FIGS. 2, 5A, and 5B, guide posts 71A, 71B each have a camming surface 97 disposed thereon. Since the construction of guide posts 71A, 71B is identical and for ease of illustration, camming surface 97 has only been shown on guide post 71B. Camming surface 97 has a lower stop position 98, and is designed to cooperate with camming pin 96 of rotatable sleeve 94 (see FIG. 3). Camming surface 97 on guide post 71, rotatable sleeve 94, and camming pin 96 form positioning means 72. As each guide member 70 is lowered into engagement with its respective guide post 71, camming pins 96 engage camming surfaces 97 of guide posts 71, thereby causing sleeves 94 to rotate until camming pins 96 have reached the lower stop positions 98 of camming surfaces 97. Lower stop position 98 is disposed on each guide post 71 at a known angular orientation with respect to its respective structural member, end 67 of pipeline 66 or end 65 of platform riser 64. Preferably, lower stop position 98 is disposed at an angle parallel or perpendicular to the longitudinal axis of the structural member 64 or 66. Upon retrieval of template 68, as will be hereinafter described, the position of camming pin 96 within guide member 70 indicates the angular orientation of the corresponding structural member with respect to the guide member.

With reference now to FIG. 2, each guide member 70 may be provided with a means 99 for locking the guide member 70 into a fixedly secured relationship with respect to its respective end 86, 87 of frame member 69. Locking means 99 may preferably comprise a plurality of hydraulically actuatable grips, wedges, or locking pins, which are actuated via hydraulic pressure supplied by hydraulic line 104, which slideably engages with one of the guidelines 78. A number of suitable locking means 99 will be apparent to those skilled in the art. Locking means 99 includes a hydraulically actuated locking device 100 associated with each guide member 70 to lock rotatable sleeve 94 with respect to tubular member 92 of guide member 70. Locking means 99 also includes a hydraulically actuated locking means 101 associated with each hinge 88, 89 to fixedly secure the angular orientation between the guide members 70A, 70B and the ends 86, 87 of frame member 69. Alternatively, if ball joint couplings are substituted for hinges 88, 89, locking means 101 would be utilized to lock the ball joint couplings after template 68 has been properly positioned. Thus, actuation of locking means 99 will prevent further movement between rotatable sleeves 94 and guide members 70 and between guide members 70 and frame member 69.

Variable length frame member 69 is provided with a means 102 for marking the frame member 69 to indicate to what length frame member 69 has been extended or retractd after guide members 70 have been fully engaged with their respective guide posts 71, as will be hereinafter described in greater detail. Preferably, the marking means 102 is disposed on second tubular member 82 adjacent its end 103 which receives first tubular member 81. Marking means 102 may also be used to mark the angular orientation of first tubular member 81 with respect to second tubular member 82.

With reference now to FIGS. 1 and 2, the operation of the remotely operable template 68 of the present invention will be described. After pipeline 66 and its guide base structure 77 has been laid on ocean floor 63, a gross measurement of the approximate distance between guide posts 71A and 71B may be obtained through the use of conventional acoustic transponders 104 mounted on guide base structures 74, 77 adjacent guide posts 71A, 71B. Having obtained the approximate distance between guide posts 71A and 71B, a template 68 is selected that has a variable length frame member 69 which has an operating length larger than the approximate distance between the guide posts 71A, 71B. The desired template 68 is then lowered downwardly toward the guide posts 71A, 71B, along guidelines 78. As template 68 is lowered toward guide posts 71, the outwardly flared sections 93 of guide members 70 will initially contact the tops of guide posts 71 which will cause variable length frame member 69 to be extended or retraced as necessary. Thus, first tubular member 81 will telescope either outwardly or inwardly with respect to second tubular member 82 of variable length frame member 69. As template 68 is further lowered, camming pins 96 of guide members 70 will engage the camming surfaces 97 of guide posts 71 causing the sleeves 94 to rotate with respect to guide posts 71. When each of the camming pins 96 has moved downwardly into the lower stop position 98 of its corresponding camming surface 97, guide members 70 will be fully engaged with their respective guide posts 71. A subsea television camera or similar device may be utilized to verify that the guide members 70 have reached their fully engaged positions.

The distance between the two ends 86, 87 of the variable length frame member 69 and the angular orientation of each of the two guide members 70 with respect to the frame member 69 may then be measured. Preferably, hydraulic locking means 100 are actuated to fixedly secure rotatable sleeves 94 within guide members 70. Simultaneously, locking means 101 are actuated to fixedly secure the hinges 88, 89 whereby the angular orientation between the guide members 70A, 70B and variable length frame member 69 are fixed. Marking device 102 may then be actuated to either score, or mark with waterproof ink, a reference mark on first tubular member 81 of variable length frame member 69 to indicate how far tubular member 81 has telescoped outwardly or inwardly and to what angle tubular member 81 has rotated with respect to second tubular member 82. Alternatively other means well known in the art may be used to measure, observe, or record the relative positions of first tubular member 81 and second tubular member 82.

When the necessary reference mark or marks have been placed on first tubular member 81, template 68 is raised to the surface of the body of water. While template 68 is being raised, locking devices 100 and 101 are still actuated to maintain the angular orientations of the guide members 70A, 70B with respect to variable length frame member 69 and the position of rotatable sleeve 94 within guide member 70. First tubular member 81 is allowed to freely move with respect to the second tubular member 82 as the template 68 is raised, in order to prevent binding between the fixedly secured guide members 70A, 70B and the guide posts 71A, 71B.

After template 68 has been retrieved, the distance between the ends of the variable length frame member 69 can be determined by observing the reference mark which has been placed upon first tubular member 81 by marking device 102. This measurement, in turn, indicates the exact distance between the guide posts 71, in that the distance between the ends 86, 87 of variable length frame member 69 and the center of their respective guide members 70A, 70B can readily be determined. By measuring the angular orientation between the guide members 70A, 70B and variable length frame member 69, the angular orientation of guide post 71A with respect to guide post 71B may also be determined. The angular positions of camming pins 96 within guide members 70A, 70B indicate the proper angular orientation between each guide member and the corresponding structural member. Since the exact distance and angular orientation of each guide post 71A, 71B with respect to its respective structural member, platform riser 64 or pipeline 66, is known, the distance and angular orientation between the unconnected structural members may be calculated and the required pipeline spool piece may be fabricated.

After the required spool piece has been fabricated, similar guide members 70A, 70B may be secured to the fabricated spool piece at locations which will mate with guide posts 71A, 71B. The fabricated spool piece and associated guide members may then be lowered via the same guidelines 78 toward the ocean floor 63 until the guide members are positioned on, and fully engaged with, the guide posts 71A, 71B, at which time the spool piece may be fully connected to the platform riser 64 and pipeline 66 as by conventional connector hubs associated with each end of the spool piece.

The apparatus and method of the present invention and the best mode contemplated for practicing the invention have been described. It is to be understood that the invention is not limited to the foregoing which has been set forth for illustrative purposes. Various modifications and alternatives will be apparent to one skilled in the art without departing from the true scope of the invention. For example, the variable length frame member could be comprised of a central tubular member which telescopically and rotatably receives at each end a tubular member having a guide member movably secured thereto. Other types of positioning means and locking means could be employed without departing from the scope of the invention. All such modifications and alternatives are included within the scope of the present invention, as defined in the following claims.

We claim:

1. An apparatus for remotely determining the distance and angular orientation between two structurally unconnected members, said apparatus comprising:
    two guide posts, each of said guide posts fixedly attached adjacent to, in a known spaced relationship with, one of said structurally unconnected members;
    a variable length frame member having two ends;
    two guide members movably secured, respectively, to said ends of said frame member, each of said guide members corresponding to and adapted to mate with one of said guide posts, whereby each of said guide members acquires a specific angular orientation with respect to said frame member upon mating with said guide posts;
    positioning means associated with each of said guide members and its corresponding guide post for positioning each guide member on its respective guide post as said guide member is mated with said guide post; and
    means for recording the distance between said ends of said frame member and for recording the specific angular orientation of each of said guide members with respect to said frame member, after said guide members have been mated with said guide posts.

2. The apparatus of claim 1 wherein said variable length frame member comprises at least one first tubular member which is telescopically and rotatably received within a second tubular member.

3. The apparatus of claim 1 wherein said guide members are movably secured to the ends of said frame member by hinges.

4. The apparatus of claim 1 wherein said positioning means comprises:
    a rotatable sleeve associated with each guide member;
    a camming pin associated with each rotatable sleeve; and
    a camming surface, having a lower stop position, associated with each guide post, the angular orientation between said lower stop position and the corresponding structurally unconnected member being known, whereby as each guide member is mated with its respective guide post, said camming pin engages said camming surface thereby causing rotation of said sleeve until said camming pin reaches said lower stop position.

5. The apparatus of claim 4 wherein said means for recording includes means for locking said rotatable sleeves within their respective guide members so as to prevent further movement therebetween after said guide members have been mated with their respective guide posts.

6. The apparatus of claim 1 wherein said means for recording the specific angular orientation of said guide members with respect to said frame member includes means for locking each guide member into a fixedly secured relationship with respect to its respective end of said frame member after each guide member has been mated with its respective guide post.

7. The apparatus of claim 6 wherein said variable length frame member comprises at least one first tubular member which is telescopically and rotatably received within a second tubular member.

8. The apparatus of claim 7 wherein said means for recording the distance between said ends of said frame member and for recording the specific angular orientation of each of said guide members with respect to said frame member includes a means for marking said first tubular member to indicate to what length said first tubular member has been extended or retracted, after said guide members have been mated with their respective guide posts.

9. The apparatus of claim 8 wherein said means for marking also marks the angle to which said first tubular member has been rotated with respect to said second tubular member.

10. The apparatus of claim 1 wherein said means for recording the distance between said ends of said frame member and for recording the specific angular orientation of each of said guide members with respect to said frame member includes a means for marking said frame member to indicate to what length said frame member has been extended or retracted after said guide members have been mated with their respective guide posts.

11. A method for remotely determining the distance and angular orientation between two structurally unconnected members, said method comprising the steps of:
   disposing a guide post in a known spaced relationship with, and adjacent to, each of said structurally unconnected members;
   engaging each of said guide posts with a guide member, said guide members being movably secured, respectively, to the outer ends of a variable length frame member, whereby each of said guide members acquires a specific angular orientation with respect to said variable length frame member upon the engagement with said guide posts; and
   recording the distance between said outer ends of said variable length frame member and recording the specific angular orientation of each of said guide members with respect to said variable length frame member, whereby the distance and angular orientation between said structurally unconnected members may be computed from such recorded information.

12. The method of claim 11, said method further comprising the steps of:
   providing said variable length frame member with at least one first tubular member; and
   telescopically and rotatably mounting said first tubular member within a second tubular member associated with said variable length frame member.

13. The method of claim 12, said method further comprising the step of marking the first tubular member with a reference mark to indicate the angle to which the first tubular member has been rotated with respect to the second tubular member.

14. The method of claim 11, said method further comprising the step of movably securing said guide members to said ends of said variable length frame member by hinges.

15. The method of claim 11, said method further comprising the steps of locking each guide member into a fixedly secured relationship with respect to said variable length frame member after said guide members have been fully mated with their respective guide posts, whereby the specific angular orientation of said guide member with respect to said variable length frame member is recorded.

16. The method of claim 11 wherein the distance between said outer ends of said variable length frame member is recorded by marking said frame member with a reference mark.

17. A method for determining from a remote location the distance and angular orientation between two structurally unconnected members, each of said structurally unconnected members having a guide post disposed in a known spaced relationship therewith, said method comprising the steps of:
   engaging said guide posts with a remotely operable template, said remotely operable template having a variable length frame member with two ends and two guide members movably secured, respectively, to said ends of said variable length frame member, said guide members adapted to mate, respectively, with said guide posts, whereby each of said guide members acquire a specific angular orientation with respect to said frame member upon mating with said guide posts;
   marking said variable length frame member to indicate the length thereof after each of said guide members has been mated with its corresponding guide post;
   locking each of said guide members into a fixedly secured relationship with respect to said variable length frame member after each of said guide members has been mated with its corresponding guide post; and
   retrieving said remotely operable template to said remote location whereby the distance and specific angular orientation between said guide posts may be measured and the distance and angular orientation between said structurally unconnected members may be computed from such measurements.

* * * * *